Figure 1:
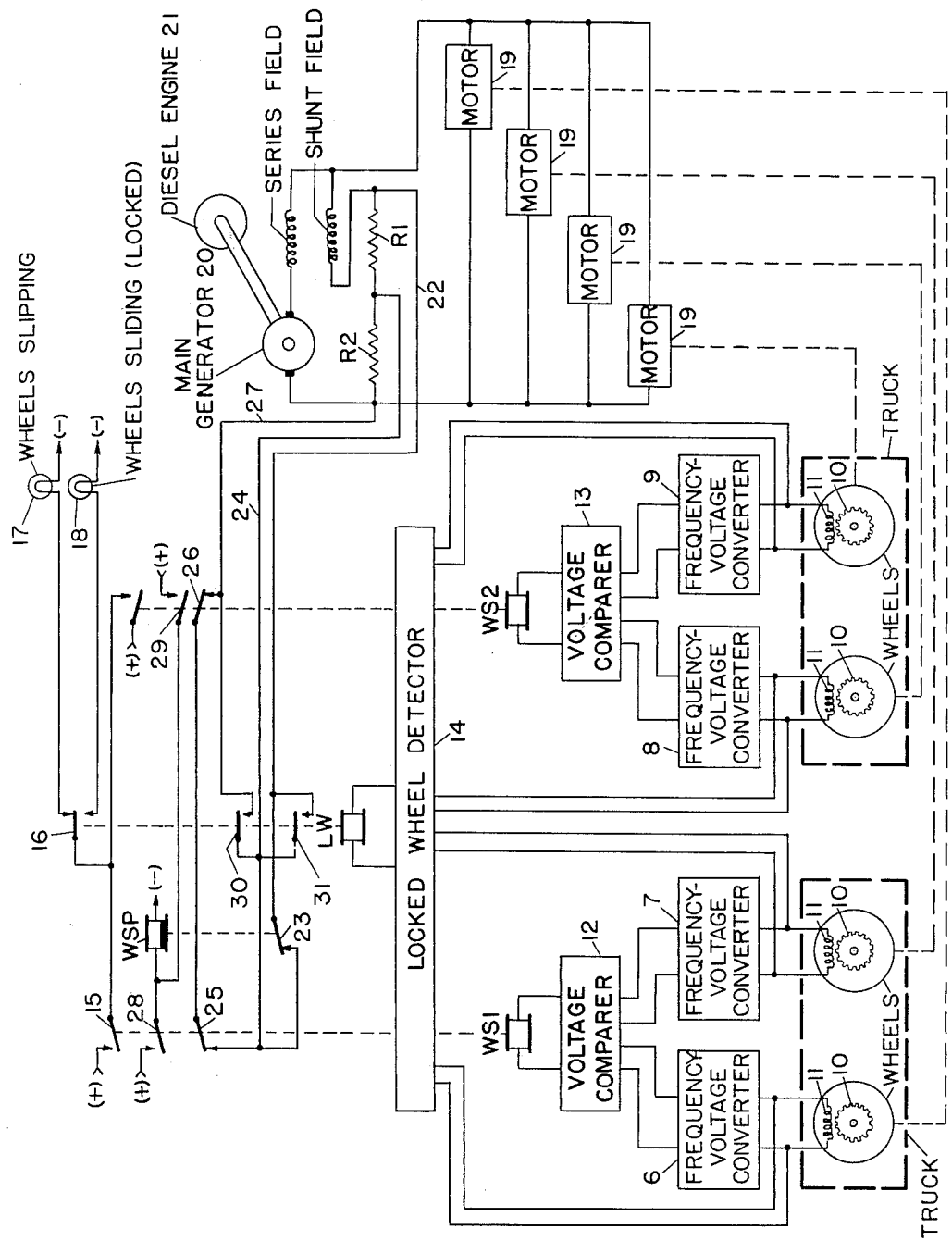

Feb. 14, 1956 W. K. MAENPAA 2,735,090
APPARATUS FOR DETECTION OF NONSYNCHRONOUS
ROTATION OF LOCOMOTIVE AXLES
Filed March 18, 1953 6 Sheets-Sheet 2

Fig. 2.

INVENTOR.
W.K. MAENPAA
BY Forest B. Hitchcock
HIS ATTORNEY

Feb. 14, 1956

W. K. MAENPAA 2,735,090

APPARATUS FOR DETECTION OF NONSYNCHRONOUS
ROTATION OF LOCOMOTIVE AXLES

Filed March 18, 1953

6 Sheets-Sheet 3

*INVENTOR.*
W. K. MAENPAA
BY
*Forest B. Hitchcock*
HIS ATTORNEY

INVENTOR.
W.K. MAENPAA
BY
Forest B. Hitchcock
HIS ATTORNEY

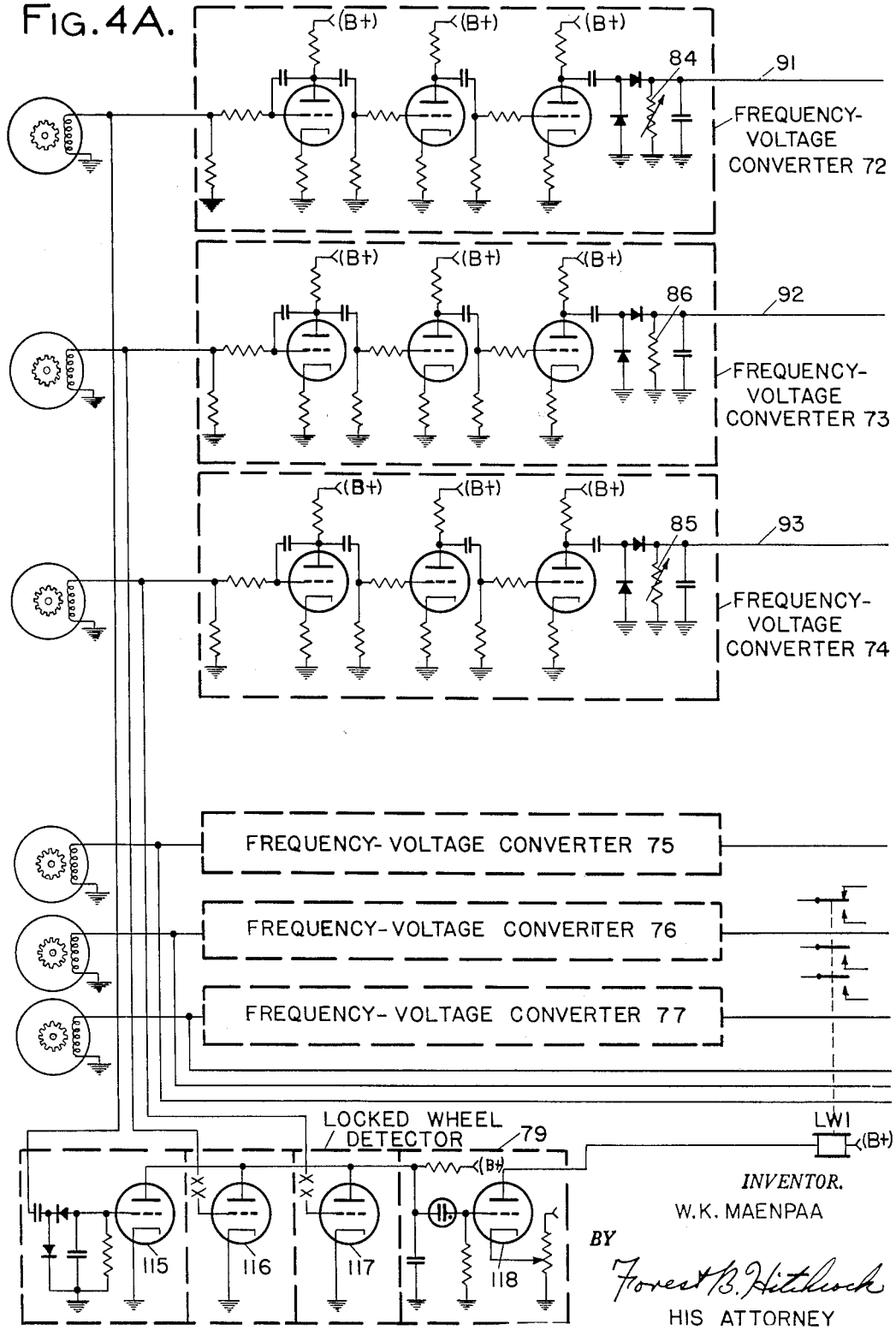

Feb. 14, 1956
W. K. MAENPAA
2,735,090
APPARATUS FOR DETECTION OF NONSYNCHRONOUS
ROTATION OF LOCOMOTIVE AXLES
Filed March 18, 1953
6 Sheets-Sheet 6
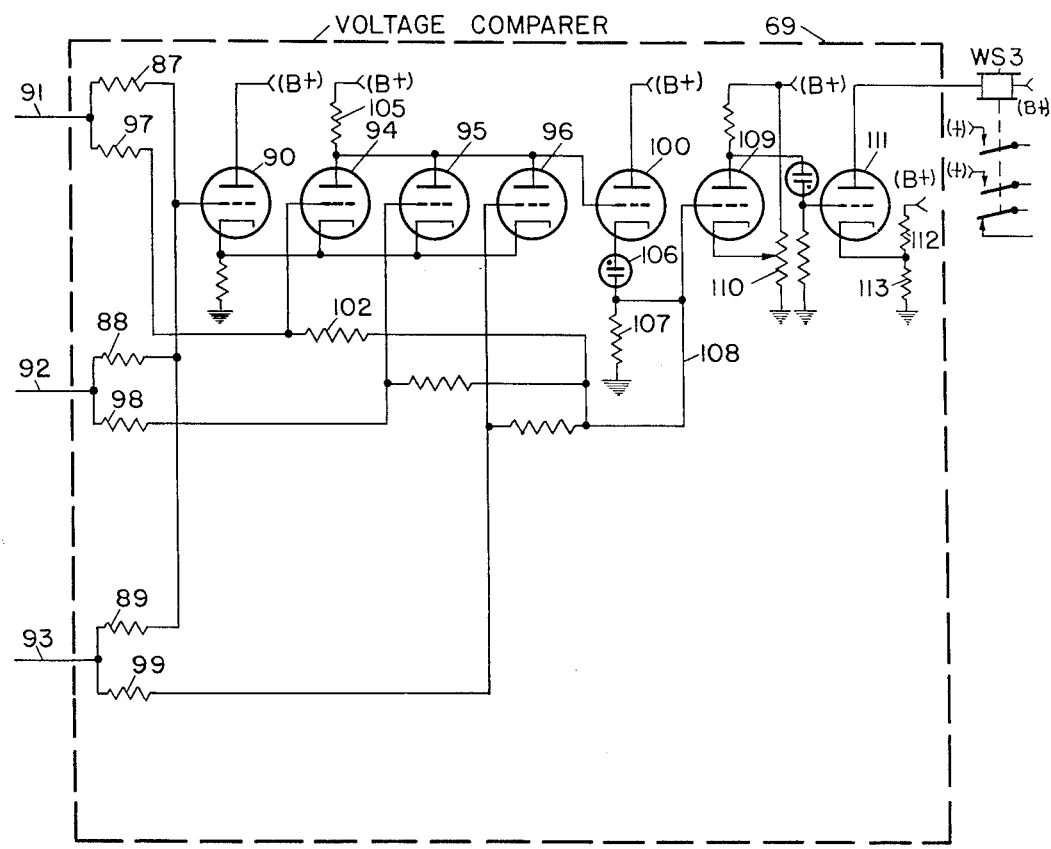
FIG.4B.
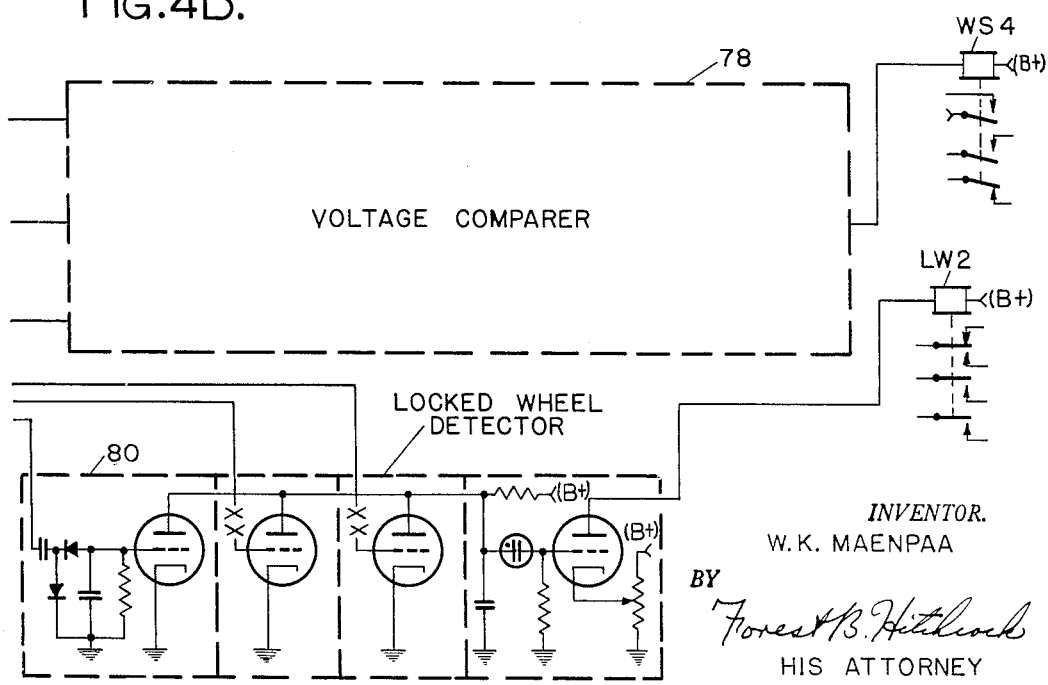
*INVENTOR.*
W. K. MAENPAA
BY
Forest B. Hitchcock
HIS ATTORNEY

United States Patent Office 2,735,090
Patented Feb. 14, 1956

2,735,090

APPARATUS FOR DETECTION OF NONSYNCHRONOUS ROTATION OF LOCOMOTIVE AXLES

Wilho K. Maenpaa, Rochester, N. Y., assignor to General Railway Signal Company, Rochester, N. Y.

Application March 18, 1953, Serial No. 343,170

12 Claims. (Cl. 340—268)

This invention relates to apparatus for detecting nonsynchronous operation of a plurality of rotatable elements, and more particularly pertains to equipment for the detection of locked or slipping wheels on locomotives.

The need to provide means for detecting wheel slippage and wheel locking arises from the severe damage that may result when these conditions occur for any appreciable length of time. Tests have shown, for example, that at relatively high train speeds, one or more slipping axles of a diesel-electric or all-electric locomotive may actually rotate at a speed as much as twice that of the nonslipping axles. Such a condition may cause motor flashovers and the throwing of armature windings on the motor driving the slipping axle. Damage to rails and wheels results when the wheels slip or slide for prolonged intervals. A locked wheel may also be the cause of a derailment. For these reasons, it is important that either slipping or locking of locomotive wheels be immediately detected so that steps can be taken to correct the condition either by the train engineer or by automatic apparatus.

The detection of locked or slipping wheels is far more troublesome on diesel-electric and all-electric locomotives than on steam locomotives. On steam locomotives the driving wheels are usually coupled mechanically so that any locking or slipping involves all of the wheels and is, therefore, readily heard and felt by the engineer who can then correct the condition. On diesel-electric and all-electric locomotives, however, there may be as many as 16 individual driven axles and 8 idler axles, any one or more of which is subject to slipping or locking. It is obviously impractical to assume that under these conditions the engineer will be able to detect by himself that slipping or locking of any axle is taking place.

Wheel slippage occurs rather frequently when a heavy train is being put into motion because then the torque delivered by the motors to the driving wheels is at a maximum. Slippage is common too, however, at higher train speeds. At these higher speeds, the action of the springs and equalizers associated with a truck may cause a momentary reduction of load on an axle so that the wheels on that axle start to slip. A locked and sliding wheel may at times be caused, on the other hand, by the application of the air brakes with or without simultaneous dynamic braking, or by the freezing of a bearing, or by a broken brake shoe.

One way to correct a slipping condition is to control either the particular traction motor driving the slipping axle so as to reduce its torque, or to control the generator supplying that traction motor for the purpose of reducing the electrical power applied to that traction motor and in that way reduce its output torque. The occurrence of a sliding condition requires either that the brake application be lessened, sand be applied to the rails, or that the equipment be inspected to determine that it is operating properly. Regardless of the action that is taken with respect to either wheel slippage or wheel sliding, it is obviously important that the condition of nonsynchronous axle rotation be quickly detected and that it furthermore be known whether the nonsynchronous rotation is caused by the sliding of one or more pairs of wheels or is, in fact, the result of a wheel slippage condition.

Various devices have been used for the purpose of detecting when a wheel is either slipping or sliding. Some of these devices comprise relays controlled by differences in currents or voltages between different traction motors. When one driven axle is rotating at a speed appreciably different from that of another, various currents and voltage values associated with the respective traction motors driving these axles also are different and tend to produce actuation of the detector relay. This means for detecting a sliding or slipping axle is relatively insensitive, however, at higher train speeds. The reason for this insensitivity is that the relay is generally adapted to operate at one particular current or voltage differential. The armature current of a motor is, however, very high when the motor starts, is a minimum at low speeds, and increases again as the speed becomes higher so that the fixed differential, if chosen to provide sensitive slip detection at low train speeds, is relatively insensitive at higher train speeds. For this reason, it is believed desirable that a device which is to detect differences in speeds of rotation of axles be actually controlled according to the angular velocity of the axles in question rather than by current or voltage values of the associated traction motors.

One kind of apparatus adapted to detect the existence of a difference in angular velocities of rotating axles makes use of axle-driven brushes which are in contact with commutators. These devices are believed not to be able to provide trouble-free service over long periods of time because of the steady wear taking place between brush and commutator surfaces. They have the further drawback of being somewhat slow in operation, thereby allowing the undesirable condition to persist for too long a time.

In view of these various considerations, it is an object of this invention to provide a combination wheel slip and wheel slide detection apparatus having appropriate sensitivity characteristics over substantially the entire range of train speeds which does not involve the use of cooperating members in physical contact with each other.

Another object of this invention is to provide wheel slip and wheel slide detection apparatus which cooperates with control apparatus for automatically eliminating a wheel slippage condition promptly after it occurs.

An additional object of this invention is to provide apparatus for the detection of wheel slip and wheel slide conditions which compares the angular speeds of two axles on each locomotive truck to determine if either is slipping.

A further object of this invention is to provide apparatus for the detection of wheel slip and wheel slide conditions which simultaneously compares the angular speeds of each of a plurality of axles on a locomotive truck against the average speed of all the axles on the truck to determine if any axle is slipping.

Another object of this invention is to provide apparatus effective to detect wheel slip and wheel slide conditions and having a sensitivity which is variable with train speed in a preselected manner.

An additional object of this invention is to provide apparatus effective to detect wheel slip and wheel slide conditions employing a feedback circuit organization to provide increased sensitivity.

Other objects, purposes, and characteristic features of this invention will in part be pointed out as the description of the invention progresses and will in part be obvious from the accompanying drawings.

Figure 3A:
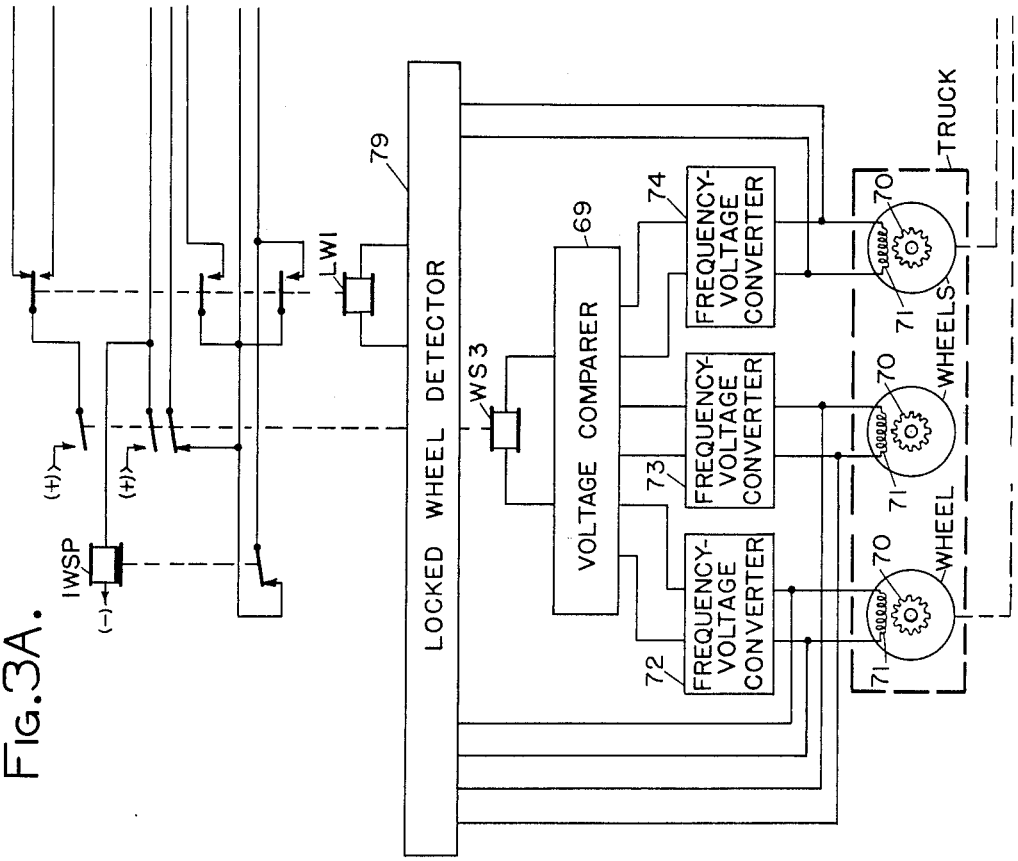
Figure 5:
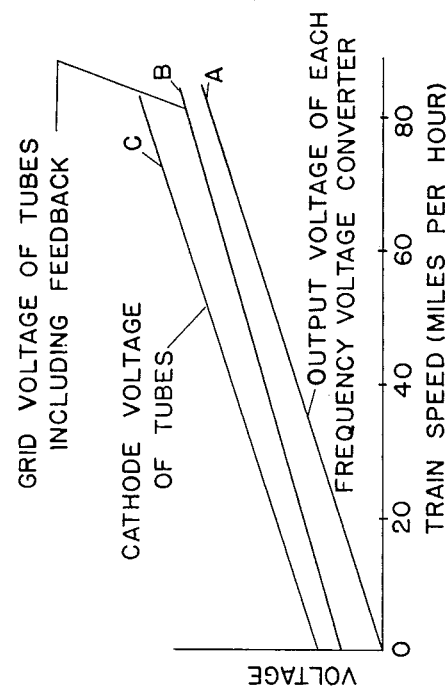
Figure 3B:
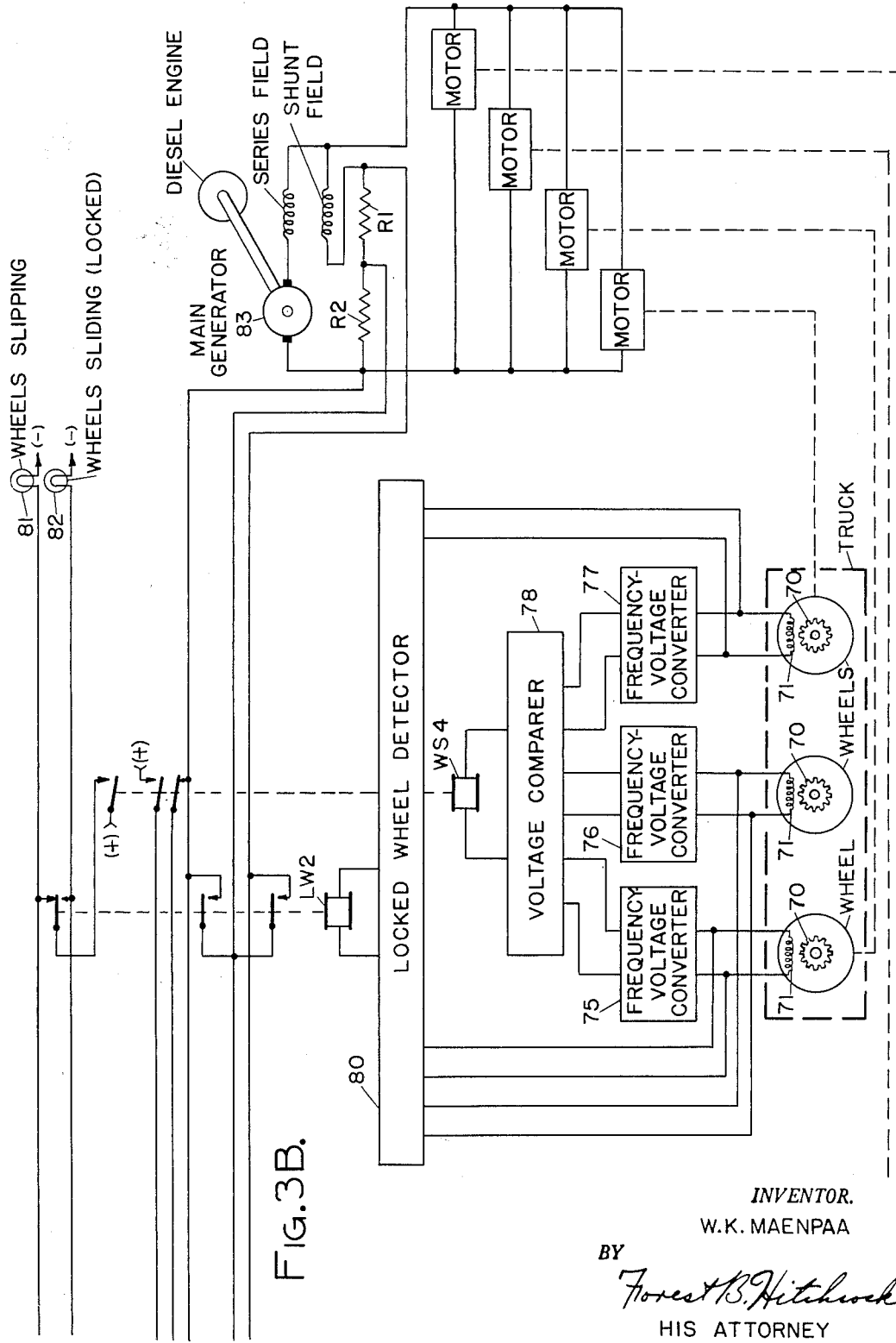

In describing this invention in detail, reference will be made to the accompanying drawings in which like reference characters designate corresponding parts throughout the several views and in which:

Fig. 1 diagrammatically illustrates one embodiment of the present invention;

Fig. 2 is a circuit diagram showing in greater detail the circuit organization of Fig. 1;

Figs. 3A and 3B, when placed side by side, diagrammatically illustrate another embodiment of this invention;

Figs. 4A and 4B, when placed side by side, comprise a circuit drawing of the second embodiment of this invention; and Fig. 5 illustrates graphically certain features of this second embodiment of the invention.

To simplify the illustration and facilitate the explanation of this invention, the various parts and circuits constituting the embodiment of the invention are shown diagrammatically, and certain conventional illustrations have been used. The drawings have been made to make it easy to understand the principles and manner of operation rather than to illustrate the specific construction and arrangement of parts that might be used in practice. The various relays and their contacts are shown in a conventional manner. The symbols (+) and (—) indicate connections made to the opposite terminals of a source of relatively low voltage suitable for the operation of various electromagnetic relays and the like. The symbol (B+) and the symbol for a ground indicate connections to the opposite terminals of a source of higher voltage as is required for the operation of various electronic tubes.

Described briefly, the invention comprises a means that may be designated a tone generator associated with each axle to be checked for slipping or sliding conditions that provides an output frequency proportional to the angular velocity of that axle. The speed of rotation of each checked axle is compared to that of a similar axle or to the average speed of a plurality of axles by converting the output frequency obtained from each axle to a corresponding voltage having an amplitude proportional to the frequency value and then comparing these voltages. A difference in these compared voltages indicates that there is a corresponding difference in axle speed which may be caused either by the excessive angular speed of a slipping axle or by the zero or near zero angular speed of a locked axle. Additional apparatus is then provided to detect whether all of the checked axles are rotating above a certain minimum angular speed. If one or more axles is not rotating above this minimum speed, the indication of nonsynchronous rotation received shows that one or more wheels is locked and is sliding. If all the wheels are indicated as rotating above the preselected minimum speed, then the indication of nonsynchronous rotation shows that one or more axles is slipping at a speed in excess of the others.

The embodiment of the invention diagrammatically illustrated in Fig. 1 and in greater detail in Fig. 2 shows a pair of trucks on a locomotive, each including two driven axles. In this embodiment, the angular speeds of the two driven axles are compared with each other to determine if slipping or sliding is taking place.

Frequently the trucks on a locomotive include three axles of which two may be driven while the third is an idler axle or, alternatively, all three may be driven. In the form of the invention shown in detail in Figs. 4A and 4B, the speeds of the three axles on trucks of this kind are simultaneously compared. More specifically, the speed of each axle is continuously compared with the average speed of all the axles on the truck. All the axles are also checked to determine if sliding is taking place by ascertaining whether all axles are rotating above a certain minimum speed.

First embodiment (Figs. 1 and 2)

Each axle whose speed is to be checked has associated with it a tone generator which comprises, as diagrammatically illustrated in Fig. 1, a toothed tone wheel 10 and a coil 11. Each tone wheel is mechanically coupled to a respective axle so that it rotates with the same angular speed as the axle. There is, therefore, induced in the coil 11 a voltage whose frequency corresponds to the angular velocity of the associated axle. The particular form that such a tone generator may assume and the manner in which this voltage is induced are shown in detail in the application No. 256,634 to Oscar S. Field, filed November 16, 1951, and for this reason, the tone generator is shown in the accompanying drawings only diagrammatically.

The output of each tone generator is applied to one of the frequency-voltage converters 6, 7, 8, or 9 respectively. The function of each converter is, as the name implies, to supply an output voltage having an amplitude which varies according to the input frequency induced in its associated coil 11. The output voltages that are thus obtained from a pair of axles are applied to a corresponding voltage comparer 12 or 13 which, in turn, controls a wheel slip detection relay WS1 or WS2, respectively. When the input voltages to a voltage comparer are of substantially equal amplitude, indicating that the associated axles are rotating at approximately the same speed, the voltage comparer 12 or 13 does not supply any current to the winding of its respective relay WS1 or WS2. However, when the input voltages to the voltage comparer are sufficiently unequal to indicate that the axle speeds are appreciably different, the associated relay is picked up to indicate that the corresponding axles are rotating at different speeds.

The voltage induced in each coil 11 is also applied to a locked wheel detector 14. When all axles being checked are rotating above a certain angular speed, the locked wheel detector 14 responds by causing the associated relay LW to be picked up. If any of these axles is not rotating above a certain angular speed, then the locked wheel detector 14 causes the relay LW to be dropped away. In this way, the relays WS1, WS2, and LW together not only indicate nonsynchronous rotation of the checked axles but also distinguish as to whether this condition is caused by wheels slipping or sliding. The conditions of the various relays shown in the drawings are the conditions they assume when the train is operating at a speed in excess of some preselected low level such as perhaps 5 miles an hour and no sliding or slipping is taking place.

The embodiment of the invention shown in Fig. 1 provides visual indication means whereby the engineer can be informed as to a slipping or sliding condition and also comprises apparatus for automatically correcting a wheel slipping condition. Assuming that one axle of a truck is rotating at a speed substantially above that of the other axle, then the output voltages obtained from the associated frequency-voltage converters such as the converters 6 and 7 associated with one pair of axles are sufficiently different to cause the voltage comparer 12 to pick up the relay WS1.

If all of the checked axles are then rotating above a certain minimum angular speed corresponding to a train speed of five miles per hour or so, the locked wheel detector 14 causes relay LW to be picked up. In that event, a circuit is completed from (+), through front contact 15 of relay WS1, front contact 16 of relay LW, and lamp 17 to (—), thereby giving the engineer a visual indication that one or more axles is slipping.

Assume now that one of the axles associated with relay WS1 is not rotating or is rotating with a speed corresponding to a train speed below some preselected low level because of some locking condition, whereas the other driven axle on the truck is rotating at a higher speed. Then the input voltages applied to the voltage comparer 12, will again be unequal and relay WS1 will be picked up as before. Since the generation of an induced voltage in any of the coils 11 depends upon the rotation of the associated axle above some minimum angular speed, there will be no output supplied by the tone generator associated with the axle that has its wheels sliding to the locked wheel detector 14. The relay LW will then drop away to complete a circuit from (+), through front contact 15 of relay WS1, back contact 16 of relay LW, and through lamp 18, to (−) so as to indicate that one or more wheels on the locomotive is then sliding.

Each of the axles diagrammatically shown in Fig. 1 is indicated as being driven by a corresponding traction motor 19. Each of these motors receives its input electrical energy from a main generator 20 which may be driven by a diesel engine 21. The main generator is provided with both series and shunt fields. The shunt field has connected in series with it the resistors R1 and R2 which are normally short-circuited. Resistor R1 is normally short-circuited by a circuit which includes wire 22, back contact 23 of relay WSP, and wire 24. Resistor R2 is normally short-circuited by a circuit including wire 24, back contacts 25 and 26 of relays WS1 and WS2, respectively, and wire 27.

When a wheel slip condition arises, relay WS1 or relay WS2 picks up, depending on which axle is slipping, and the relay LW remains in its picked up condition. As soon as either relay WS1 or WS2 picks up, a circuit is completed through the respective front contacts 28 or 29 of these relays to energize the slow release repeater relay WSP. The shunting circuit for the resistor R2 is also opened by the opening of either back contact 25 or 26, of relays WS1 or WS2, respectively.

When relay WSP picks up, the shunting circuit for resistor R1 is opened by the opening of back contact 23 of relay WSP. With the shunts for the resistor R2 and R1 thus open-circuited, the resistance in series with the shunt field of the main generator is appreciably increased so that the current through the shunt field is reduced. The output voltage of the main generator is thereby quickly reduced so that the electrical energy input to the traction motors is also reduced. This reduces the output torque of these motors and quickly corrects the slipping condition.

It has been found that if the output torque delivered by a traction motor to a slipping axle is reduced so as to eliminate a slipping condition and then the motor torque is quickly increased to its initial value, the slipping condition may immediately start again. For this reason, the embodiment of the invention shown in Fig. 1 provides means whereby the output torque of a motor is restored to its initial value following a slipping condition in steps, with full output being restored only after a brief interval has elapsed.

When slip first occurs, the generator output is reduced so that the output torque of the motor is also reduced as described. When this action results in the stopping of the slippage condition, the relay WS1 or WS2 which provided the slip indication by its picking up quickly drops away. Consequently, resistor R2 is once more shunted through the back contacts 25 and 26 of relays WS1 and WS2, respectively. The resistance in series with the shunt field of the main generator is thereby reduced so that the shunt field current increases, and the resulting increase of generator output causes the output of the traction motors to increase.

Although relay WS1 has dropped away so as to deenergize relay WSP, the slow drop away characteristics of relay WSP cause it to remain picked up for a while. As long as the back contact 23 of this relay WSP remains open, the resistor R1 remains unshunted in the shunt field circuit of the generator. After a while, however, relay WSP finally drops away and closes its back contact 23 to thereby shunt resistor R1. The resistance in the shunt field circuit is then reduced to its original value and the output of the main generator 20 is restored to its initial value so that the full output is obtained from the traction motors. This short waiting period which takes place before the full output of the traction motors is applied to the driven axles is ordinarily effective to ensure that the slipping condition will not immediately recur.

When a sliding condition of one or more wheels occurs, relay LW drops away as already explained. The closure of its back contacts 30 and 31 shunts both resistors R1 and R2 so that even though either relay WS1 or WS2 will at the same time drop away, the motor torque will not be automatically reduced because of the wheel slide condition.

When axles on additional trucks are to be checked for slipping or sliding conditions, additional apparatus may be provided for each truck similar to that shown diagrammatically in Fig. 1 for the two trucks included in that drawing.

The detailed description of the frequency-voltage converters to be presented will deal particularly with the converter 6 since the converters shown are substantially alike. The detailed circuit diagram of Fig. 2 shows that the output voltage obtained from the coil 11 associated with each axle is applied through a grid resistor 35 to the control grid of triode tube 36 which is the first tube included in the frequency-voltage converter 6. The capacitor 32 connecting the plate of tube 36 to its control grid provides negative feedback for the purpose of attenuating sharp, spurious changes in the input voltage that may at times occur.

The function of the first tube 36 is to amplify the output voltage received from the associated coil 11, and the output of this first tube is then applied to the control grid of the second triode tube 37. This second tube 37 is actually overdriven as is also the third tube 46 on both negative and positive peaks of the input voltage wave so that clipping occurs on the positive peaks because of grid circuit clipping and on the negative peaks as a result of plate current cutoff. Consequently, the output voltage obtained at the plate of tube 46 comprises substantially a square wave of voltage.

The plate voltage of the triode tube 46 is then applied to a cascade voltage doubler circuit which comprises the capacitors 38 and 39, rectifiers 40 and 41 and resistor 42. Because of the polarity of the rectifiers 40 and 41 chosen for the frequency-voltage converter 6, the polarity of the voltage appearing at point A is negative with respect to ground; whereas, the opposite polarity of rectifiers 33 and 34 for the other frequency-voltage converter 7 causes a positive voltage with respect to ground to appear at point B.

As long as the voltages appearing at points A and B are of equal or nearly equal amplitude and of opposite polarity, substantially zero grid voltage is obtained for the control grid of tube 43 included in the voltage comparer 12. Despite this approximately zero grid-to-ground voltage, the positive cathode voltage that is supplied to tube 43 by reason of its cathode being connected to the junction of resistors 44 and 45 connected between (B+) and ground results in a negative grid-cathode voltage which permits some plate current flow through the tube 43.

If the speed of either of these checked axles varies with respect to the other, the amplitudes of the voltages at points A and B will no longer be equal so that the voltage at the grid of tube 43 will either increase or decrease depending upon which axle has its speed varied and in what direction this speed variation takes place. With either an increase or decrease of grid voltage for triode tube 43, there results either an increase or decrease of plate current, respectively, for this tube with a resulting corresponding decrease or increase of plate voltage.

For the condition when both axles being checked are rotating at the same speed, a particular corresponding value of plate voltage is produced at the plate of tube 43 according to the amount of plate current it is conducting, and the corresponding grid voltage of tube 47 causes this tube to conduct through its cathode resistor 49 and the neon lamp 48. The voltage appearing across cathode resistor 49 as a result of this flow of plate current cathode is applied to the control grid of triode tube 50. The resulting conduction of plate current by tube 50 causes a voltage to appear across its cathode resistor 51, and this voltage is applied also to the cathode of tube 52. At the same time, a particular value of grid voltage is chosen for tube 52 as selected by the position of the movable tap on potentiometer 53. The potentiometer adjusts the grid-cathode voltage to cause a plate current conduction of tube 52 that will cause the plate voltage of this tube to substantially equal the plate voltage of tube 50. Under this condition, relay WS1 which has its winding connected between the plates of tubes 50 and 52 is deenergized.

The neon lamp 48 serves to reduce the actual level of voltage that is applied to the control grid of tube 50 without substantially affecting the change of voltage that appears at this grid. If the neon lamp 48 were not inserted in the cathode circuit of tube 47, the cathode potential of tube 47 would quite closely approximate the plate voltage of tube 43. This level of voltage is too high for the control grid of tube 50. The use of a resistor of proper value in place of the neon lamp 48 would reduce this voltage level applied to the grid of tube 50 but would also reduce the voltage change that is applied to this grid. Because of the fixed and relatively low voltage drop that appears across the neon lamp 48, changes in voltage appearing in the cathode circuit appear almost entirely across the resistor 49 so that the full voltage change is effective on the grid of tube 50.

When the voltages at points A and B become unequal as a result of a difference in speed of the associated axles, the grid voltage of tube 43 is either increased or decreased, thereby varying the plate current and the plate voltage of tube 43. As a result tube 47 conducts more or less plate current because of the rise or fall of its grid voltage. The result is that there is either an increase or decrease of voltage across cathode resistor 49 depending upon which of the two axles is rotating faster. Consequently, the grid voltage of tube 50 is either increased or decreased accordingly.

When the control grid potential for tube 50 is either increased or decreased, the plate current through the tube varies accordingly. Assuming that the grid voltage for tube 50 is increased, the resulting increase of plate current causes the voltage at the plate of tube 50 to decrease. At the same time, the voltage at the cathode of this tube also increases and causes a reduction in grid-cathode voltage for tube 52 so that this tube conducts less plate current and its plate voltage increases. In this way, a difference in plate potential is produced between the plates of the tubes 50 and 52 and this potential difference causes a current to flow through the winding of relay WS1 and causes this relay to pick up.

If, on the other hand, the voltage at the grid of tube 50 is decreased, then the plate voltage of this tube increases but its cathode voltage decreases. The grid-cathode voltage of tube 52 then increases and the increase of plate current through 52 causes a reduction in its plate voltage. Again a difference in voltage appears between the plates of these tubes 50 and 52 which is effective to cause the picking up of relay WS1.

The tone generators of similar pairs of axles are applied to respective frequency-voltage converters such as converters 8 and 9 with the output of each pair of such converters being applied to a voltage comparer such as the comparer 13 which then controls an associated relay such as the relays WS1 and WS2.

The output of the tone generator for each axle is also applied to the input circuit of a triode tube included in the locked wheel detector 14. When an axle is rotating at a very slow speed such as below five miles per hour, there is only a very low amplitude of voltage induced in the associated tone generator. However, at speeds in excess of this lower limit such as five miles per hour, the voltage appearing across the winding of each associated tone generator rises to a certain level which then remains substantially constant at all higher speeds because of the increase of loading that occurs in response to higher frequency outputs of the tone generators.

The input circuit for each of the triode tubes 58, 59, 60, and 61 included in the locked wheel detector 14 comprises what is commonly known as a cascade voltage doubler. The polarity of the rectifiers used in these voltage doublers such as the rectifiers 56 and 57 associated with tube 58 cause a negative voltage to appear at the control grid of the corresponding tube when an alternating input voltage is received from the corresponding coil 11. Because of the voltage doubling action, the amplitude of this voltage is substantially equal to twice the peak voltage of the input alternating voltage.

When the input received from a coil 11 reaches a predetermined level corresponding perhaps to an axle speed of five miles an hour, the negative voltage at the grid of the corresponding triode tube reaches an amplitude sufficient to cut off that tube. Thus, if the train speed is in excess of five miles an hour and all of the axles are rotating at speeds corresponding to some train speed in excess of five miles an hour, all the triode tubes 58 to 61 in the locked wheel detector 14 receiving their input voltages from the coils 11 will be cut off. With no plate current passing through the relatively large common plate resistor 62, the voltage at the plates of these tubes will equal substantially the (B+) voltage level. However, if any axle is rotating at a speed below the minimum corresponding to a five mile an hour train speed or is not rotating at all, then the corresponding triode tube will not be cut off. In that event, the plate current for that tube, in passing through the common plate resistor 62, will cause a substantial reduction of voltage for the plates of these tubes.

When all of the triode tubes 58 to 61 are cut off, the high plate voltage for these tubes is applied to the series combination of neon lamp 63 and grid resistor 64 associated with tube 65. The voltage that then appears on the grid of this tube 65 is sufficiently higher than the cathode voltage as selected by the potentiometer 66 to cause tube 65 to conduct and thereby pick up the relay LW included in its plate circuit. When, however, the plate voltage for the tubes 58 to 61 is at a low level because of the conduction of one or more of these tubes, the control grid voltage for tube 65 is reduced so that it will be sufficiently below the cathode voltage to cause this tube 65 to be cut off and then the relay LW will drop away to thereby indicate that one or more axles is slipping.

*Second embodiment (Figs. 3A, 3B, 4A, 4B, and 5)*

Figs. 3A and 3B diagrammatically illustrate another embodiment of this invention for use particularly where the angular speeds of more than two axles on a truck are to be simultaneously checked. The circuit diagram of this embodiment of the invention is shown in Figs. 4A and 4B.

Each of the trucks shown in Figs. 3A and 3B includes three axles, and each axle is provided with a tone generator comprising the toothed tone wheel 70 which is in inductive relationship with the coil 17. Only two of the axles of each truck are shown as receiving a mechanical input from an associated motor; the third axle on each truck is an idler axle. This embodiment of the invention can as well be used, however, with trucks having all driven axles. And although particularly useful when three or more axles on a truck are to be simultaneously checked, this embodiment can also be used in place of the embodiment of Fig. 2 when only two axles on a truck are being checked.

The coil 71 included in the tone generator for each axle supplies an induced voltage having a frequency corresponding to the angular speed of the axle to a frequency-voltage converter 72 to 77. The output voltages of all three frequency-voltage converters of a truck are applied to a respective voltage comparer 69 or 78. If all three voltages received by the voltage comparer are of substantially equal amplitude, indicating that the respective axles are rotating at approximately the same speed, the slip indicating relay WS3 or WS4 as the case may be, is deenergized. However, if the voltage applied to the voltage comparer from any one of the three frequency-voltage converters of a truck increases a predetermined amount over the output voltage provided by the other two frequency-voltage converters, then the voltage comparer causes the associated slip indicator relay to pick up.

The voltages induced in the various coils 71 associated with a truck are also applied to a locked wheel detector 79 or 80. Although a separate locked wheel detector is provided for each truck in this embodiment of the invention, a single locked wheel detector may be provided to detect a locked wheel condition for two or more trucks as is shown for the embodiment of the invention illustrated in Fig. 1. The use of separate locked wheel detectors 79 and 80 for the different trucks makes it possible to disable only the apparatus associated with one particular truck if there is an equipment failure without in any way affecting the operation of the apparatus for the remaining trucks on the locomotive.

The apparatus which is provided to give a visual indication that a slipping or sliding condition is taking place is similar to that shown in Fig. 1. With either of the slip indicating relays WS3 or WS4 picked up, and if the corresponding locked wheel indicating relay LW1 or LW2 is not picked up, lamp 81 will be illuminated to indicate that the wheels are slipping. If either relay WS3 or WS4 picks up and, at the same time, the corresponding relay LW1 or LW2 is picked up, then the lamp 82 is illuminated to give a visual indication that a sliding condition is taking place.

The circuit organization shown in Fig. 3 which provides for the automatic elimination of a wheel slipping condition is also similar to that shown in Fig. 1. The relays WS3, WS4, and 1WSP cooperate to cause the output of the main generator 83 to be substantially reduced immediately upon the detection of a wheel slip condition. When the slipping condition has been remedied because of reduced motor torque, the main generator 83 is allowed to increase its output but not to its original high level. Only after a suitable time interval, is the shunt field current of the generator increased to the level that allows the main generator to provide its original full output. If a locked wheel condition causes either relay LW1 or LW2 to drop away, the resistors R1 and R2 are shunted even though either relay WS3 or WS4 will also drop away. Thus, the motor torque is not automatically reduced during a wheel slide condition.

As shown in Fig. 4A, the frequency-voltage converter associated with each axle is substantially the same as that shown in Fig. 2. One difference, however, is that the various frequency-voltage converters in Fig. 4A all have the rectifiers included in the cascade voltage doubler circuit poled in the same way so that each converter provides an output voltage of positive polarity with respect to ground. Also, variable resistors 84 and 85 are provided for the frequency-voltage converters 72 and 74, respectively, whereas a fixed resistor 86 is provided for the frequency-voltage converter 73. This permits the output voltages of the two frequency-voltage converters 72 and 74 to be adjusted in amplitude with respect to the output voltage of the converter 73 so that for any particular train speed the output voltages of all the frequency-voltage converters will be the same, assuming that all three associated axles are revolving at the same speed.

The positive output voltages of the various frequency-voltage converters 72, 73, and 74 are applied through respective resistors 87, 88, and 89 to the grid of the cathode follower tube 90. The voltage on the grid of this tube 90 represents, as will become clear from the following description, the average of the output voltages of the frequency-voltage converters 72–74.

Under the condition where all the axles are rotating at the same speed so that the output voltages of the corresponding frequency-voltage converters are equal, there is no current flow through the resistors 87–89. The voltage at the grid of the cathode follower tube 90 thus equals the output voltage of each frequency-voltage converter. If now an axle starts to slip, the output voltage of the frequency-voltage converter associated with that axle such as the converter 72 increases with respect to the output voltage of the other frequency-voltage converters 73 and 74. With the voltage on wire 91, for example, above that on wires 92 and 93, there is a flow of current from the wire 91 to the wires 92 and 93. This current flows through the resistor 87 and then through separate parallel paths including respectively the resistors 88 and 89. Since these resistors 87–89 are all preferably of the same value, ⅔ of the voltage difference between wire 91 and wires 92 and 93 appears across the resistor 87. Consequently, the voltage increase at the grid of tube 90 resulting from the increase of output voltage of the frequency-voltage converter is only about ⅓ of the increase of voltage of this frequency-voltage converter 72 over that of the frequency-voltage converters 73 and 74. In this way, the voltage at the grid of the cathode follower tube 90 represents the average of the output voltages of the various frequency-voltage converters. When a different number of these frequency-voltage converters supply output voltages to a common cathode follower tube included in the voltage comparer, the proportions are different from those specifically mentioned here as an example, but the manner of operation in general remains the same so that the grid of this cathode follower tube receives a voltage that is the average of the output voltages of the various frequency-voltage converters.

The cathode voltage of tube 90 is slightly greater than the voltage applied to the control grid, the difference in these two voltages representing the normal grid-cathode bias of this tube. Since the cathodes of the tubes 94, 95, and 96 are all connected to the cathode of the cathode follower tube 90, the cathode voltage of each of these tubes is greater than the voltage applied to the control grid of tube 90 and is thus greater than the average of the output voltages of the various frequency-voltage converters 72–74. Under conditions of synchronous axle rotation, therefore, the cathode voltage of each tube 94–96 somewhat exceeds the output voltage of the corresponding frequency-voltage converter. This condition is illustrated graphically in Fig. 5. In this graph, it is shown that the output voltage of each frequency-voltage converter (line A) is zero when the train is standing still and rises in an approximtely linear fashion as the train speed increases. For any train speed, the cathode voltage of the tubes 94–96 (line C) is shown as being somewhat above the output voltage of each frequency-voltage converter by a substantially fixed amount.

The output voltages of the frequency-voltage converters 72–74 are additionally applied through the respective resistors 97, 98, and 99 to the control grids of the tubes 94, 95, and 96, respectively. If the feedback voltage that is also applied to the grids of these tubes from the cathode circuit of tube 100 is ignored for the moment, then the grid voltage of each tube is substantially the same as the grid voltage of the averaging tube 90. Since the cathodes of these tubes 94–96 are all at the same potential as the cathode of the averaging tube 90, the grid-cathode voltages of these tubes 94–96 are about the same as that which is effective on tube 90 so that these tubes 94–96 also conduct only a slight amount of plate current. Because of this low amplitude of plate current through the common plate resistor 105 for these tubes, a relatively high grid voltage is applied to tube 100. This tube 100 therefore conducts a fairly high level of plate current through the gas discharge lamp 106 and cathode resistor 107. As will be seen, the relatively high level of plate current conduction for tube 100 is maintained over the entire range of train speeds provided that a slipping or sliding condition does not occur. As a result, the voltage across the cathode resistor 107 and appearing on wire 108 remains at approximately the same level even though the train speed may vary widely.

At low train speeds, the output voltages of the various frequency-voltage converters are low as shown in Fig. 5. The voltage divider included between the output of each frequency-voltage converter and the wire 108 causes a portion of the voltage difference between these points to be applied to the control grid of the corresponding triode tube 94–96. The voltage divider associated with the grid circuit of the tube 94, for example, includes resistors 97 and 102 connected in series between wires 91 and 108.

At low train speeds, a relatively large voltage difference exists between wire 91 in the frequency-voltage converter 72 and wire 108 in the voltage comparer 69. Substantially the same voltage difference exists between the outputs of the other frequency-voltage converters 73 and 74 and the wire 108 in the voltage comparer 69. A preselected portion of such voltage difference dependent on the relative values of the resistors included in the voltage dividing network associated with the grid circuit of each of the triode tubes 94–96 is applied to the control grids of these tubes. Because of this relatively large voltage difference existing at low train speeds, the feedback voltage obtained from the cathode circuit of tube 100 is effective to add appreciably to the control grid voltage of the tubes 94–96. At high train speeds, the output voltage of each frequency-voltage converter is considerably higher so that a far smaller potential difference exists between the output of each frequency-voltage converter and the wire 108. The voltage dividing network associated with each tube 94–96 causes the same portion of this smaller voltage difference to be applied to the control grid of the corresponding tube. In this way, the feedback voltage becomes effective to add a smaller amount to the grid voltage of each of the tubes 94–96 at higher train speeds than at lower train speeds.

This differential feedback effect is graphically illustrated in Fig. 5. Line B, which represents the grid voltage of the tubes 94–96 including the feedback voltage, is shown at low train speeds as being appreciably above the output voltage of each frequency-voltage converter. At higher train speeds where the feedback becomes less effective, the grid voltage of each of the tubes 94–96 is shown as being greater than the output voltage of each frequency-voltage converter by a smaller amount. The effect of this differential feedback is to cause each of the tubes 94–96 to be more sensitive to an increase of voltage received from its associated frequency-voltage converter under a slipping condition at low train speeds than at high train speeds.

More specifically, the slipping of an axle causes the output voltage of the corresponding frequency-voltage converter to rise in amplitude and thereby increase the grid voltage of the associated triode tube 94–96. Since the feedback voltage at low train speeds causes the control grid of such tube to be raised to a value closer to the voltage applied to its cathode, only a relatively small increase of voltage representing a correspondingly small variation in speed of the associated axle as compared with the other two axles need occur to make such tube conduct appreciably more current and thereby give an indication of wheel slippage as will subsequently be more fully explained. At higher train speeds, the decreased effect of the feedback voltage prevents the control grid voltage from rising to a value as close to that applied to the cathode. Consequently, a somewhat greater voltage increase must be received from the corresponding frequency-voltage converter as compared with that received from the other two converters for the triode tube to conduct the same amount of plate current as before.

The results of this differential feedback circuit organization are to produce a very high sensitivity of the apparatus at low train speeds so that only a slight disparity in axle speeds occurs before an indication of such condition is given to the engineer. At high train speeds, however, such extreme sensitivity is not desired because the normal variation in wheel diameter may result in a fairly appreciable difference in angular velocity. A somewhat decreased sensitivity of the detection apparatus at these higher train speeds thus serves to prevent the giving of false indications as to wheel slip and wheel slide conditions.

Under conditions of synchronous axle rotation, the control grid-cathode potential of tube 100 is relatively high as previously explained because of the high plate voltage for the tubes 94–96. The voltage that is developed, therefore, across the cathode resistor 107 of tube 100 causes the potential on the control grid of tube 109 to be relatively high. A fixed bias voltage is applied to the cathode of this tube 109 as a result of the connection of the cathode to a tap on the potentiometer 110 which is connected between the (B+) terminal and ground. The relatively high grid potential causes this tube to conduct a substantial amount of plate current so that its plate voltage is low. The potential on the control grid of tube 111 is thus sufficiently below the cathode potential for this tube, as selected by the voltage dividing network including resistors 112 and 113 connected between (B+) and ground, to cause tube 111 to be cut off. There is, therefore, no flow of plate current through the winding of relay 1WS1 so that this relay is dropped away.

If an axle such as the axle associated with this frequency-voltage converter 72 begins to rotate at a speed appreciably above that of the axles corresponding to the frequency-voltage converters 73 and 74, the output voltage obtained from the frequency-voltage converter 72 rises above that produced by the other frequency-voltage converters 73 and 74. The voltage applied to the grid of the averaging tube 90 also rises in amplitude to correspond to the new, higher average of the output voltages of the various frequency-voltage converters 72–74. The cathode voltages of the tubes 94–96 rise accordingly.

The voltage at the grid of tube 94 rises in amplitude appreciably more than does the voltage on the cathodes of the tubes 95 and 96. In other words, the increase in output voltage of the frequency-voltage converter 72 may be appreciable as the associated axle slips, and this voltage increase is effective directly on the grid of tube 94. The change in the average voltage applied to the grid of tube 90 is less, however, so that the cathodes of tube 94–96 experience a correspondingly smaller increase of voltage. The grid-cathode voltage of tube 94 becomes appreciably less negative, therefore, so that this triode tube 94 conducts a substantial amount of plate current through the common load resistor 105. The common plate voltage for the tubes 94–96 thus decreases and causes the tube 100 to conduct less plate current.

With a lower amplitude of plate current passing through the cathode resistor 107 of tube 100, there is a reduction in amplitude of voltage on the grid of tube 109. The reduced plate current flow through this tube 109 causes its plate voltage to rise so that the control grid of tube 111 is made more positive. Tube 111 conducts current, therefore, so that the winding of relay WS3 is energized and this relay then picks up.

Similar frequency-voltage converters 75, 76, and 77 are provided for each axle on a second truck, and these are shown in block form in Fig. 4A. The output voltages of these frequency-voltage converters are applied to a voltage comparer 78 which is similar to the voltage comparer 69 already described. The output of this voltage comparer 98 controls the relay WS4.

Each truck has associated with it a locked wheel detector. The locked wheel detector 79 receives inputs from the tone generators associated with the axles of one truck, and the locked wheel detector 80 receives input voltages from the tone generators associated with the axles of the second truck. The output of each locked wheel detector controls a corresponding relay LW1 or LW2.

The operation of each locked wheel detector is similar to the locked wheel detector shown in Fig. 2. Each axle rotating above some preselected angular velocity causes a sufficient output voltage to be generated in its associated tone generator to cause the control grid of the corresponding tube in the locked wheel detector for that truck to be driven to cutoff with respect to its cathode. When all three axles of one truck are rotating above this preselected speed, for example, the various triode tubes 115, 116, and 117 included in the locked wheel detector 79 are all cut off. The plate voltage of these tubes is thus high so that a relatively high voltage appears on the control grid of tube 118. This tube, therefore, conducts plate current through the winding of relay LW1 so that this relay is normally picked up. If any of these axles is not rotating above the preselected minimum speed, the associated triode tube will be conducting and thereby cause a sufficient reduction in grid voltage for tube 118 so that this tube will be cut off and the relay LW1 dropped away. The other locked wheel detector 80 is effective in a similar manner to control the relay LW2.

There is thus provided by the circuit organization of this invention an improved means for detecting nonsynchronous rotation of the axles of a locomotive and cooperating means for correcting a slipping condition. Having described two specific embodiments of this invention, I wish it to be understood that the forms selected are intended to facilitate in the disclosure of this invention rather than to limit the number of forms it may assume and that various modifications, adaptations, and alterations may be applied to the specific forms shown to meet the requirements of practice without in any manner departing from the spirit or scope of this invention.

What I claim is:

1. In apparatus for detecting slipping and sliding wheel conditions on railroad locomotives, speed responsive means associated with each axle to be checked for said slipping and sliding conditions for providing an output voltage proportional in amplitude to the angular velocity of said axle, voltage comparing means governed by said output voltages received from each of a plurality of said speed responsive means associated with said axles for giving a distinctive output when any of said output voltages differs by more than a preselected amount from the other of said output voltages, slide detection means governed by the angular velocities of said axles and being effective to provide a different distinctive output when any of said axles is rotating with an angular velocity below a preselected minimum value irrespective of the relative angular velocities of said axles, and means responsive jointly to said different distinctive outputs received from said voltage comparing means and said slide detection means for providing one kind of indication for said sliding condition and another kind of indication for said slipping condition.

2. In apparatus for detecting nonsynchronous rotation of a plurality of locomotive axles, a tone generator associated with each axle and having a voltage induced therein with its frequency proportional to the angular velocity of said axle, frequency-voltage converter means associated with each tone generator and being effective to provide an output voltage proportional to said induced frequency, voltage comparing means associated with a plurality of said frequency-voltage converter means, first relay circuit means governed by said voltage comparing means, said voltage comparing means being effective to control said first relay circuit means to a distinctive condition when the output voltage from any associated frequency-voltage converter means is greater by a preselected amount than the outputs of the other frequency-voltage converter means also associated with said voltage comparing means, locked wheel detector means, second relay circuit means controlled by said locked wheel detector means, said locked wheel detector means being effective to control said second relay circuit means to a distinctive condition when the output voltage of any tone generator is below a preselected minimum value thereby indicating that the associated axle is sliding, and means governed by said first and said second relay circuit means for selectively giving an indication of either slipping or sliding wheel conditions.

3. In apparatus for detecting slipping and sliding wheel conditions on railway locomotives, a plurality of tone generators each associated with a corresponding axle and having a voltage induced therein with its frequency proportional to the angular velocity of the associated axle, said induced voltage being of zero amplitude when the associated axle is not rotating and rising above a predetermined value when said axle rotates with an angular velocity above a corresponding preselected minimum value, wheel slip detection means governed by the relative frequency values of said plurality of voltages for detecting when any of the associated axles is rotating at a speed substantially above that of the others, locked wheel detection apparatus comprising a plurality of vacuum tubes each being negatively biased to an extent governed by the amplitude of the voltage induced in a corresponding one of said plurality of tone generators, a common plate circuit for said tubes having a plate resistor, said tubes all being biased to cut off when the associated axles are all rotating above said preselected minimum speed and having a common high plate voltage, means responsive to said common plate voltage for said tubes for providing a distinctive output when said plate voltage is reduced in amplitude by reason of any of said axles rotating below said preselected minimum speed, and relay circuit means governed by both said wheel slip detection means and said locked wheel detection apparatus for providing one kind of indication for a wheel slip condition and another kind of indication for a wheel slide condition, whereby an indication is given by said apparatus of both sliding and slipping wheel conditions.

4. Apparatus for detecting slipping and sliding wheel conditions on locomotives comprising, traction motors on said locomotives associated respectively with a plurality of said axles, wheel slip detection apparatus, wheel slide detection apparatus, electromagnetic relay means governed jointly by both said wheel slip detection apparatus and said wheel slide detection apparatus and being controlled to a distinctive condition when any of said axles rotates with an angular velocity greater by a preselected amount than the other of said axles as determined by said wheel slip detection apparatus provided all said axles are rotating with an angular velocity above a preselected minimum as determined by said wheel slide detection apparatus, and means for reducing the output torque of said traction motors in response to said relay means being controlled to a distinctive condition to thereby eliminate said wheel slip condition.

5. Apparatus for detecting slipping and sliding wheel conditions on railroad locomotives comprising, traction motors on said locomotives associated respectively with a plurality of said axles, wheel slip detection apparatus, electromagnetic relay means governed by said wheel detection slipping apparatus and being controlled to a distinctive condition when any of said axles rotates with an angular velocity greater by a preselected amount than the other of said axles, circuit means for reducing the output torque of said traction motors in response to said relay means being controlled to its distinctive condition to thereby eliminate said wheel slip condition, said relay means being restored to its initial condition when said axles are again rotating synchronously and causing thereby an increase in output torque of said traction motors, time delay means being initiated into operation when said relay circuit means is restored for preventing said motor torque from being restored to its full original value for a preselected delay time measured by said time delay means, whereby the output torque of said traction motors is restored to its original value in steps to prevent an immediate recurrence of said slipping condition.

6. In apparatus for detecting nonsynchronous rotation of a plurality of locomotive axles, a tone generator associated with each axle and having a voltage induced therein with its frequency proportional to the angular velocity of said axle, frequency-voltage converter means associated with each tone generator and being effective to provide an output voltage proportional to said frequency, voltage comparing means associated with each pair of said frequency-voltage converters, one of said pair of frequency-voltage converter means being adapted to provide an output voltage of positive polarity proportional in amplitude to the angular velocity of the corresponding axle, the other of said pair of frequency-voltage converter means being adapted to provide an output voltage of negative polarity proportional in amplitude to the angular velocity of the associated axle, said voltage comparing means including an electron tube having both said positive and negative voltages applied to its control grid, said voltages being equal and opposite and combining to give a zero grid voltage for said tube when the associated axles are rotating at the same angular velocity, circuit means including a relay being actuated in response to either an increase or decrease in said grid voltage occurring when said output voltages are made unequal in absolute value beyond a preselected limit by a difference in angular velocities of the corresponding axles, wheel slide detection means being effective to provide a distinctive output when any of said axles is rotating with an angular velocity below a preselected minimum value irrespective of the relative angular velocities of said axles, and means responsive jointly to said different distinctive outputs received from said voltage comparing means and said slide detection means for providing one kind of indication for said sliding condition and another kind of indication for said slipping condition.

7. In apparatus for detecting nonsynchronous rotation of a plurality of locomotive axles, voltage comparing means corresponding to a pair of said axles, means associated with each of said pair of axles for providing a voltage proportional in amplitude to the angular velocity of said axles, said voltage produced by said means associated with one of said pair of axles being of positive polarity and said voltage produced by said means associated with the other of said pair of axles being of negative polarity, said voltage comparing means comprising an amplifier tube having said positive and negative voltages applied to its control grid, a pair of relay control electron tubes, a common cathode circuit for said relay control tubes including a cathode resistor, means for varying the control grid-cathode voltage for the first of said tubes in accordance with the voltage appearing on said control grid of said amplifier tube, means for applying a fixed voltage to the control grid of the second of said relay control tubes to cause it to conduct the same amplitude of plate current as the first of said tubes is controlled to conduct when said positive and negative voltages applied to the grid of said amplifier tube have the same amplitude, and a relay having its winding connected between the plate electrodes of said pair of relay control tubes, said grid voltage of the first of said pair of relay control tubes being varied when said positive and negative voltages become unequal in amplitude in response to a variation in angular velocity of the corresponding axles to thereby cause said first and second of said pair of relay control tubes to conduct different amounts of plate current so as to actuate said relay, wheel slide detection means being effective to provide a distinctive output when any of said axles is rotating with an angular velocity below a preselected minimum value irrespective of the relative angular velocities of said axles, and means responsive jointly to said different distinctive outputs received from said voltage comparing means and said slide detection means for providing one kind of indication for said sliding condition and another kind of indication for said slipping condition.

8. In apparatus for detecting nonsynchronous rotation in a plurality of locomotive axles, means associated with each of said axles for providing an output voltage proportional in amplitude to the angular velocity of said axle, a plurality of vacuum tubes one for each of said plurality of axles with each having applied to its control grid said output voltage corresponding to a respective axle, circuit means for applying to the cathode of each of said tubes a voltage slightly in excess of the average of said output voltages to thereby cause each of said tubes to be biased so as to conduct slightly under conditions of synchronous axle rotation wherein each of said output voltages substantially equals said average volatge, and means responsive to the increased conduction of any of said tubes occurring when the corresponding output voltage applied to its control grid substantially exceeds said average voltage in response to a condition of nonsynchronous rotation for giving a distinctive output indicative of said slipping condition.

9. In apparatus for detecting nonsynchronous rotation of a plurality of locomotive axles, means associated with each of said axles for providing an output voltage proportional in amplitude to the angular velocity of said axle, a plurality of vacuum tubes one for each of said plurality of axles and each having applied to its control grid said output voltage corresponding to the respective axle, differential feedback circuit means being effective to add a feedback voltage component to each of said control grids with said feedback component being a maximum at low train speeds and a minimum at high train speeds, circuit means for applying to the cathode of each of said tubes a voltage slightly in excess of the average of said output voltages to thereby cause each of said tubes to be biased to conduct slightly under conditions of synchronous axle rotation wherein each of said output voltages substantially equals said average voltage, said feedback circuit means causing said plurality of electron tubes to experience a greater increment of plate current in response to a given increment of the corresponding output voltage at low train speeds than at high train speeds, and means responsive to the increased conduction of any of said tubes occurring when any of said output voltages substantially exceeds said average voltage in response to the condition of nonsynchronous axle rotation for giving a distinctive output indicative of said slipping condition.

10. In apparatus for detecting nonsynchronous rotation of a plurality of locomotive axles, means associated with each of said axles for providing an output voltage proportional in amplitude to the angular velocity of said axle, a plurality of vacuum tubes one for each of said plurality of axles, a cathode follower tube having applied to its control grid a voltage substantially equal to the average of said output voltages, means for applying the output of said cathode follower to the cathodes of said plurality of electron tubes, a source of feedback voltage of substantially constant amplitude greater than a maximum value of said output voltages, a voltage dividing network associated with each of said plurality of tubes and connected between the source of each of said output voltages and said source of feedback voltage, each of said voltage dividing networks being effective to add a fixed proportion of the difference in voltage between the corresponding output voltage and said source of feedback voltage to said output voltage on the corresponding control grid, each of said tubes being thereby biased to conduct slightly under conditions of synchronous axle rotation wherein each of said output voltages substantially equals said average voltage, and means responsive to the increased conduction of any of said tubes when the corresponding output voltage substantially exceeds the average angular velocity in response to the condition of nonsynchronous axle rotation for giving a distinctive output indicative of said slipping condition, said feedback circuit means causing said plurality of electron tubes to be more sensitive at low train speeds to a difference in angular velocity of any axle as compared to the average angular velocity of said plurality of axles than at high train speed.

11. In apparatus for detecting nonsynchronous rotation of a plurality of locomotive axles, means associated with each of said axles for providing an output voltage proportional in amplitude to the angular velocity of said axle, voltage comparing means associated with said plurality of axles, said voltage comparing means including a cathode follower, a control grid for said tube having each of said output voltages applied thereto through a respective resistor, said resistors having substantially the same value of resistance to thereby cause the voltage on the grid of said cathode follower tube to substantially equal the average of said output voltages, an amplifier tube for each of said output voltages with each having its cathode connected to said cathode of said cathode follower tube and with said output voltage applied to its control grid, a common plate circuit for said amplifier tubes having a plate resistor, each of said amplifier tubes conducting a relatively low amplitude of plate current throughout substantially the entire range of train speeds provided that its control grid voltage substantially equals said average voltage applied to the control grid of said cathode follower tube, and means governed by a substantial reduction in plate voltage of said amplifier tubes for giving an indication of a slipping condition, whereby an increase of any of said output voltages substantially above the average of said output voltages causes the corresponding of said amplifier tubes to conduct an increased amplitude of plate current to thereby decrease said plate voltage and effect an indication of a slipping condition.

12. In apparatus for detecting nonsynchronous rotation of a plurality of locomotive axles, means associated with each of said axles for providing an output voltage proportional in amplitude to the angular velocity of said axle, means governed by a plurality of said output voltages each corresponding to one of said plurality of axles for providing an average voltage substantially equal in amplitude to the average of said output voltages, electron tube circuit means comprising a plurality of electron discharge tubes each having said average voltage applied to its cathode and said output voltage proportional in amplitude to the angular velocity of a respective axle applied to its control grid, means governed by the plate currents of said tubes and being effective when the angular velocity of any axle substantially exceeds the average speed of said plurality of axles to provide an indication of nonsynchronous rotation of said axles.

References Cited in the file of this patent

UNITED STATES PATENTS

| | | |
|---|---|---|
| 2,232,751 | Wilson | Feb. 25, 1941 |
| 2,232,752 | Wilson | Feb. 25, 1941 |
| 2,387,901 | Haverstick | Oct. 30, 1945 |
| 2,523,169 | Weybrew | Sept. 19, 1950 |
| 2,592,342 | Ryckman, Jr. | Apr. 8, 1952 |
| 2,652,555 | Smith | Sept. 15, 1953 |
| 2,701,873 | Bard | Feb. 8, 1955 |